(12) United States Patent
Wujcik et al.

(10) Patent No.: US 11,824,165 B2
(45) Date of Patent: Nov. 21, 2023

(54) SOLID-STATE LITHIUM ION MULTILAYER BATTERY AND MANUFACTURING METHOD

(71) Applicant: Blue Current, Inc., Hayward, CA (US)

(72) Inventors: Kevin Wujcik, Berkeley, CA (US); Terri Lin, Hayward, CA (US); Simmi Kaur Uppal, Oakland, CA (US); Eduard Nasybulin, Fremont, CA (US)

(73) Assignee: Blue Current, Inc., Hayward, CA (US)

( * ) Notice: Subject to any disclaimer, the term of this patent is extended or adjusted under 35 U.S.C. 154(b) by 130 days.

(21) Appl. No.: 17/248,450

(22) Filed: Jan. 25, 2021

(65) Prior Publication Data

US 2022/0238921 A1 Jul. 28, 2022

(51) Int. Cl.
*H01M 10/0585* (2010.01)
*H01M 4/62* (2006.01)
*H01M 10/0525* (2010.01)

(52) U.S. Cl.
CPC ....... *H01M 10/0585* (2013.01); *H01M 4/622* (2013.01); *H01M 10/0525* (2013.01)

(58) Field of Classification Search
CPC ............. H01M 10/0585; H01M 4/622; H01M 10/0525; Y02E 60/10; Y02P 70/50
USPC ........................................................ 429/162
See application file for complete search history.

(56) References Cited

U.S. PATENT DOCUMENTS

| | | | |
|---|---|---|---|
| 9,093,722 B2 | 7/2015 | Zhang et al. | |
| 10,707,477 B2 | 7/2020 | Sastry et al. | |
| 2014/0099556 A1* | 4/2014 | Johnson | H01M 4/13 156/244.11 |
| 2017/0352916 A1 | 12/2017 | Miyashita et al. | |
| 2019/0214650 A1 | 7/2019 | Sakamoto et al. | |
| 2020/0028156 A1 | 1/2020 | Zhang et al. | |
| 2020/0087155 A1 | 3/2020 | Rupert | |

FOREIGN PATENT DOCUMENTS

| | | |
|---|---|---|
| CN | 107069095 A | 8/2017 |
| CN | 108346523 A | 7/2018 |
| CN | 111725475 A | 9/2020 |
| CN | 112563453 A | 3/2021 |
| EP | 3361529 B1 | 5/2020 |
| JP | 2001357890 A | 12/2001 |

(Continued)

OTHER PUBLICATIONS

Rabilloud, "Handbook for Adhesives and Surface Preparation," Chapter 12, pp. 259-299, ISBN: 978-1-4377-4461-3, 2011.

(Continued)

*Primary Examiner* — Gary D Harris
(74) *Attorney, Agent, or Firm* — Weaver Austin Villeneuve & Sampson LLP

(57) ABSTRACT

Provided herein are multilayer solid-state lithium ion batteries and methods of fabrication. In some embodiments, units of preformed cell elements and a current collector (of either the anode or cathode) are stacked. The preformed cell element includes a double-sided electrode, with separator/electrode on both sides of the double-sided electrode. The double-sided electrode may be an anode or a cathode. During the stacking process, the preformed cell elements are laminated to a cathode current collector or an anode current collector, as appropriate.

17 Claims, 8 Drawing Sheets

(56) References Cited

FOREIGN PATENT DOCUMENTS

JP   2008243761 A   10/2008

OTHER PUBLICATIONS

Ribes et al., J. "Non-Cryst. Solids," vol. 38-39 (1980) 271-276.
Minami, "Non-Cryst. Solids," vol. 95-96 (1987) 107-118.
Tatsumisago et al., "Power Sources," 2014, 270, 603-607.
Zhao et al., "Superionic Conductivity in Lithium-Rich Anti-Perovskites," Jour J. Am. Chem. Soc., 2012, 134 (36), pp. 15042-15047.
International Search Report and Written Opinion dated Apr. 14, 2022, for International Application No. PCT/US2022/070327.

* cited by examiner

SOLID-STATE LITHIUM ION MULTILAYER BATTERY AND MANUFACTURING METHOD

BACKGROUND

Solid-state electrolytes present various advantages over liquid electrolytes for primary and secondary batteries. For example, in lithium ion secondary batteries, inorganic solid-state electrolytes may be less flammable than conventional liquid organic electrolytes. Solid-state electrolytes can also facilitate use of a lithium metal electrode by resisting dendrite formation. Solid-state electrolytes may also present advantages of high energy densities, good cycling stabilities, and electrochemical stabilities over a range of conditions. However, there are various challenges in large scale commercialization of solid-state electrolytes. One challenge is achieving and maintaining uniform contact between the separator and the electrodes. For example, some materials do not serve as efficient separators due to poor adhesion to the electrode during battery cell assembly and cycling. Going further, some cell assembly processes may fail to achieve uniform contact between the separator and electrodes, which can lead to lower cell performance and potentially lithium plating. Such processes may also fail to achieve uniform densification of electrode and separator materials. This is particularly challenging when a multilayer cell (also referred to as a multi-stack cell) containing a multitude of anode/separator/cathode layers is formed. As a result, such cells may have lower overall capacity and issues with lithium plating and dendrite formation. Another challenge is that glass and ceramic solid-state conductors are too brittle to be processed into dense, thin films on a large scale. This can result in high bulk electrolyte resistance due to the films being too thick, as well as dendrite formation, due to the presence of voids that allow dendrite penetration. The mechanical properties of even relatively ductile sulfide glasses are not adequate to process the glasses into dense, thin films. Improving these mechanical properties without sacrificing ionic conductivity is a particular challenge. Solid-state polymer electrolyte systems may have improved mechanical characteristics that facilitate adhesion and formation into thin films, but have low ionic conductivity at room temperature or poor mechanical strength.

SUMMARY

Provided herein are multilayer solid-state lithium ion batteries and methods of fabrication. In some embodiments, units of preformed cell elements and a current collector (of either the anode or cathode) are stacked. The preformed cell element includes a double-sided electrode, with separator/electrode on both sides of the double-sided electrode. The double-sided electrode may be an anode or a cathode. During the stacking process, the preformed cell elements are laminated to a cathode current collector or an anode current collector, as appropriate.

One aspect of the disclosure relates to a method including: forming a separator/first electrode/first current collector/first electrode/separator stack, wherein the first electrode is one of an anode composite film and a cathode composite film and the separator is a composite electrolyte separator (CES); densifying the separator/first electrode/first current collector/first electrode/separator stack; applying a second electrode to the densified separator/first electrode/first current collector/first electrode/separator stack to form a first preformed cell element including a second electrode/separator/first electrode/first current collector/first electrode/separator/second electrode stack, wherein the second electrode is the other of the anode composite film and the cathode composite film; stacking the first preformed cell element with one or more additional preformed cell elements separated by second current collectors to form a multilayer cell; and heat pressing the multilayer cell.

In some embodiments, the method further includes attaching a second current collector to one side of the first preformed cell element prior to stacking it with the one or more additional preformed cell elements. In some such embodiments, attaching the second current collector includes laminating it to the first preformed cell element.

In some embodiments, stacking the first preformed cell element with the one or more additional preformed cell elements includes stacking a second current collector between adjacent preformed cell elements.

In some embodiments, heat pressing the multilayer cell includes laminating a second current collector to second electrodes of adjacent preformed cell elements.

In some embodiments, the conductive adhesive layer disposed between the first electrode and the adjacent first current collector.

In some embodiments, the multilayer cell includes a conductive adhesive layer disposed between the second electrodes and the adjacent second current collectors.

In some embodiments, the anode composite film includes an active material, an electrolyte, and a polymer binder.

In some embodiments, the cathode composite film includes an active material, an electrolyte, and a polymer binder.

In some embodiments, the CES includes an inorganic particulate ion conductor and an organic polymer.

In some embodiments, densifying the separator/first electrode/first current collector/first electrode/separator stack includes densifying in a calender press.

Another aspect of the disclosure relates a method including providing a preformed cell element including a second electrode/separator/first electrode/first current collector/first electrode/separator/second electrode stack, wherein the first electrode is one of an anode composite film and a cathode composite film, the second electrode is the other of the anode composite film and the cathode composite film, and the separator is a composite electrolyte separator (CES); and laminating a second current collector to a second electrode of the preformed cell element.

Another aspect of the disclosure relates to a solid-state multilayer lithium ion battery including: a plurality of preformed cell elements, each preformed cell element including a second electrode/separator/first electrode/first current collector/first electrode/separator/second electrode stack, wherein the first electrode is one of an anode composite film and a cathode composite film, the second electrode is the other of the anode composite film and the cathode composite film, and the separator is a composite electrolyte separator (CES); a plurality of second current collectors disposed between preformed cell elements and laminated to the second electrodes; and conductive adhesive layers between the second electrodes and the adjacent second current collectors.

In some embodiments, the anode composite film includes an active material, an electrolyte, and a polymer binder. In some embodiments, the cathode composite film includes an active material, an electrolyte, and a polymer binder. In some embodiments, the CES includes an inorganic particulate ion conductor and an organic polymer. In some embodiments, the conductive adhesive layers include carbon additive is dispersed in a thermoplastic polymer.

In some embodiments, the battery further comprises conductive adhesive layers between the first electrodes and the adjacent first current collectors.

These and other aspects of the disclosure are described further below with reference to the Figures.

DESCRIPTION

Provided herein are methods of manufacturing solid-state lithium ion batteries. According to various embodiments, the methods involve forming preformed cell elements that are stacked together with current collectors for heat pressing. An example of a preformed cell elements is an anode current collector with anode on both sides of the current collector, with electrolyte separator film on both anode surfaces, and cathode film on both separator surfaces. During the stacking process, the preformed cell elements are laminated to cathode current collectors. Alternatively, the preformed cell element may be a cathode current collector with cathode on both sides of the current collector, electrolyte separator film on both cathode surfaces, and anode composite film on both separator surfaces. During the stacking process, the preformed cell elements are laminated to anode current collectors.

Electrode and separator films of each preformed cell element are laminated and densified prior to the multilayer cell assembly. As such, individual cell elements have carefully controlled uniformity, leading to consistent electrode and separator film thicknesses, consistent separator lamination to electrode surfaces, and consistent degrees of electrode and separator film densification for each element of the multilayer cell.

According to various embodiments, the methods and devices described herein may have one or more of the following advantages. In some embodiments, multilayer batteries including electrodes and separator films that are highly dense are provided. Unused free volume is significantly reduced or minimized, increasing volumetric energy density. In some embodiments, contact between electrolyte particles and active material particles is high, resulting in high conductivity. In some embodiments, the separator and the electrode have excellent contact and are resistant to delamination, preventing capacity fade, poor rate capability, lithium plating and short circuiting.

Using the methods described herein, uniform lamination of the separator film across the cell can be achieved. This results in uniform rates of lithiation, which prevents lithium plating that occurs with uneven lithiation. Electrodes are also evenly densified across the cell, resulting in uniform lithiation. In some embodiments, the separator and electrode films are in close contact, with substantially no voids or air gaps are present between them. This can prevent current hot spots, which can lead to shorting or plating within the separator, from developing.

Figure 1:
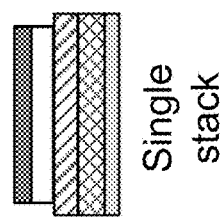
FIG. 1 shows a schematic illustrating certain operations in assembly of a solid-state battery.
Figure 1:
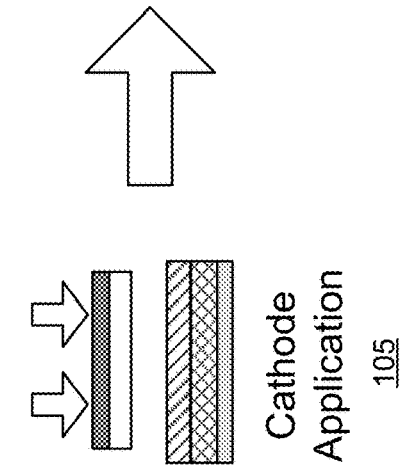
Figure 1:
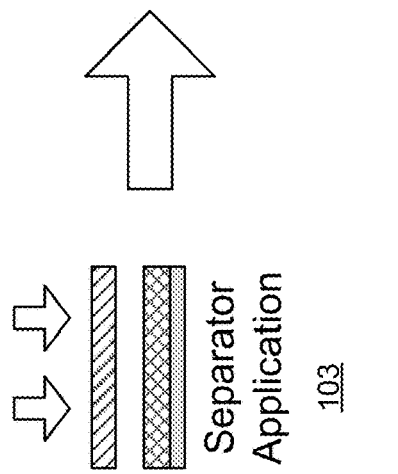
Figure 1:
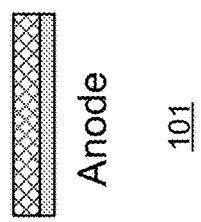
Figure 1:
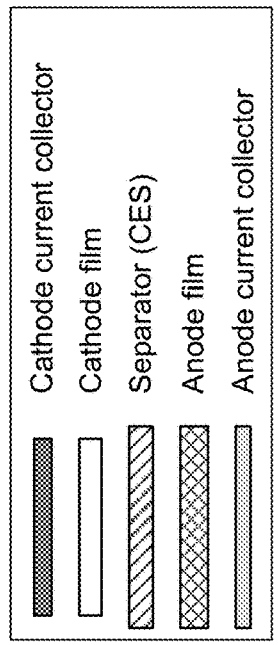
Figure 2:
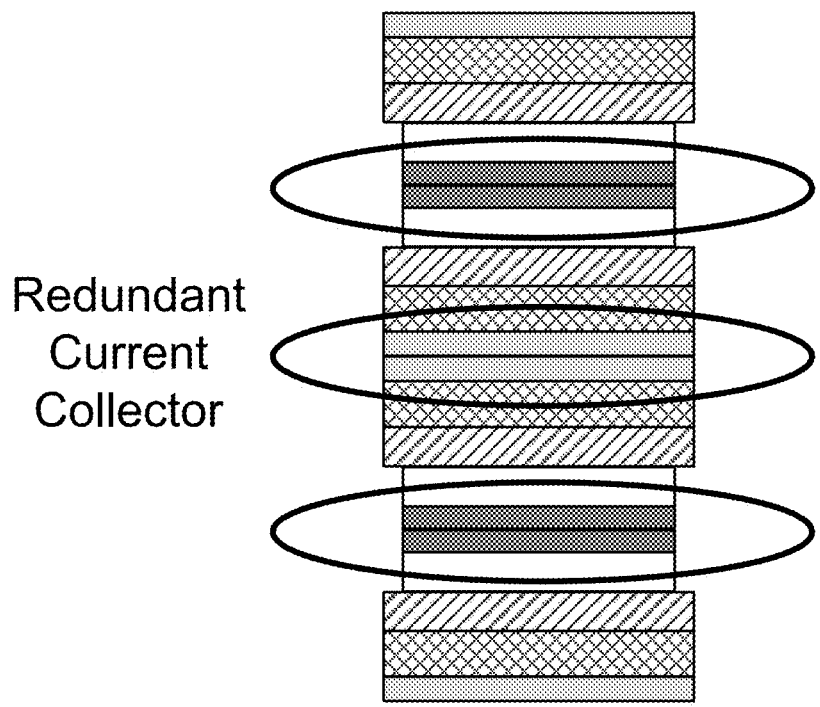
FIG. 2 shows a schematic of a solid-state battery having redundant current collectors.

FIG. 1 shows a schematic of how a solid-state battery may be assembled. First, at 101, an anode film on a current collector is shown. At 103, a solid-state electrolyte separator is applied to the anode using a technique such as lamination, casting, or extrusion. A current collector/cathode film stack is applied (e.g., by lamination, casting, or extrusion) to the current collector/anode/separator stack at 105. This results in a single cell stack 107. Stacking multiple cell stacks can be used to form a battery that contains multiple cell elements (cathode/separator/anode) in a stack. However, stacking multiple units like cell stack 107 results in lower energy density. This is because the anode and cathode current collectors are back-to-back and redundant. See FIG. 2.

Provided herein are multilayer solid-state lithium ion batteries that include double-sided electrodes. Double-sided electrodes have been used in lithium ion batteries that use liquid electrolytes. However, solid-state lithium ion batteries present problems that are not encountered in these liquid electrolyte-based lithium ion batteries. Lithium ion battery manufacturing processes achieve double-sided electrodes by casting or extruding electrode films onto both sides of the current collector foil. During the stacking process, double-sided electrodes are wound or stacked with separator placed between the double-sided anodes and double-sided cathodes. From a high-level perspective, the units being stacked in this process are the double-sided electrodes and the separator film.

Figure 3:
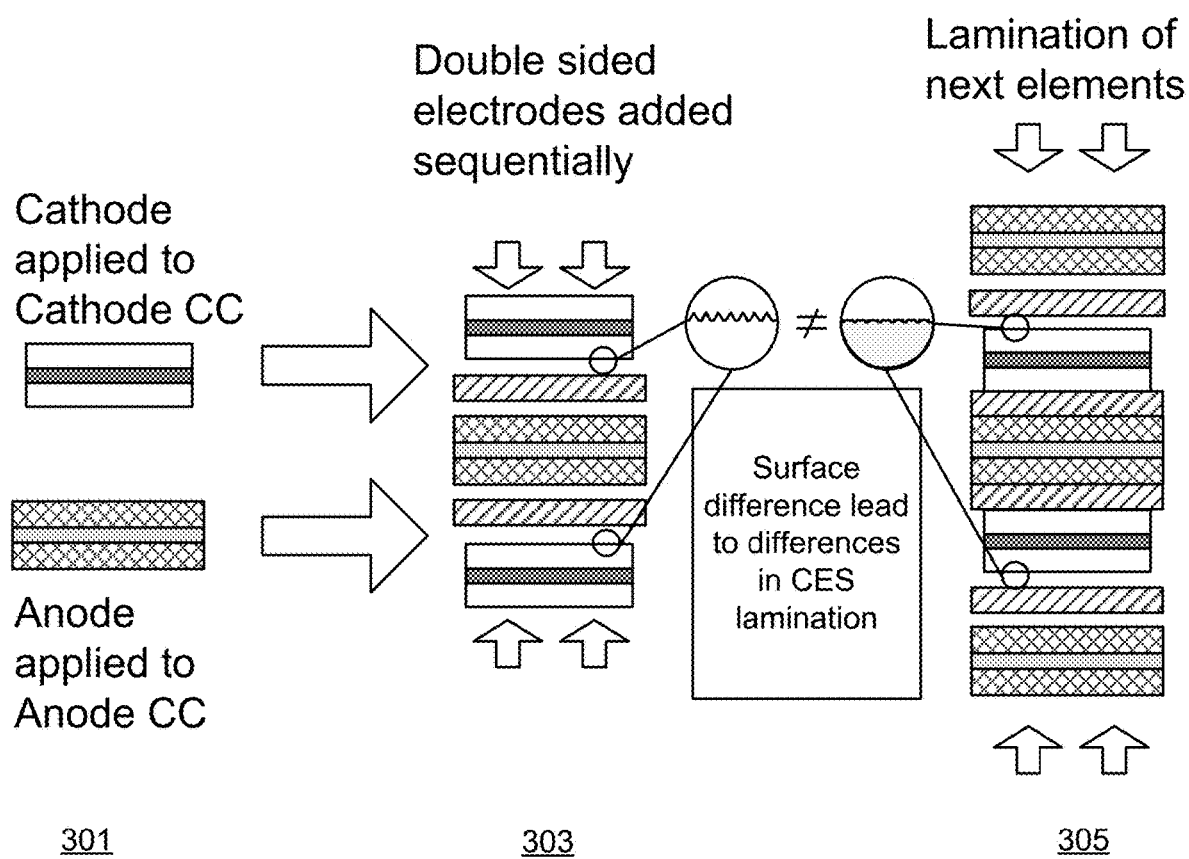
FIGS. 3 and 4 shows schematics illustrating certain operations in methods of assembly of a multilayer solid-state lithium ion battery.

Using such a process for a solid-state lithium ion battery, however, results in non-uniform performance of the cell layers in the multilayer battery. This is due to non-uniform adhesion of the solid electrolyte separator to the electrodes, and non-uniform densification of the electrodes and solid electrolyte separator. High pressures and heat are applied during the stacking process to densify and laminate the units (double-sided electrodes and separator film) together. Application of heat and pressure during the stacking process introduces new abnormalities and cell defects. FIG. 3 illustrates some of these issues. In FIG. 3, a double-sided cathode/cathode current collector and double-sided anode/current collectorRRRRRRRRRR is shown at 301. At 303, the double-side electrodes are added sequentially with separator films to make a cathode/separator/anode/separator/cathode stack. At 305, additional separator films and anode/current collectors are laminated. However, when a double-sided cathode is pressed to a separator surface at 303, the surface roughness and porosity of the outermost cathode film is changed. As a result, the mechanism through which the cathode laminates to the separator in the subsequent operation 305, and the efficacy of the lamination, is different. The same is true for the double-sided anode/separator stack that is subsequently laminated, and the double-sided cathode in the next step, and so on. As a result, the different elements within the stack will have different levels of adhesion with the separator, which leads to differences in performance within the stack.

Figure 4:
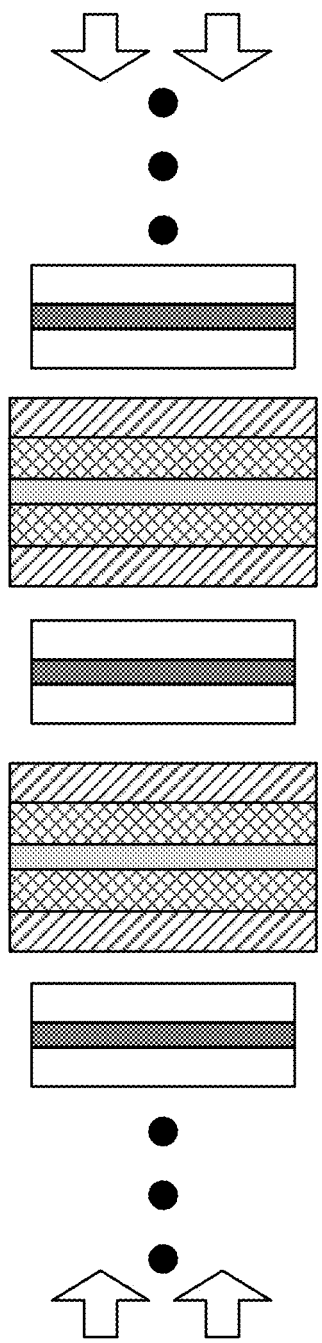

Stacking all elements prior to pressing as shown in FIG. 4 also has disadvantages. Differences may arise between the lamination and densification of elements between the top, middle, and bottom of the stack. For instance, the porosity of the top element may be different than the element on the bottom. This is due to complex changes in mechanical properties between cell elements that arise during the pressing procedure.

The methods provided herein also allow lamination and densification to be performed using a calender roll press, rather than a vertical press. A calender press has two hard cylindrical rollers with a narrow gap between the rollers, through which sheets of material are passed. The calender rollers may be heated and are used to press and form materials to achieve a desired surface finish or film thickness. In certain embodiments herein, calender presses are used to densify cell components and/or laminate cell components. Calender presses apply pressure to a material between the apex of both rollers, and in an area that is nearly one dimensional, depending on the radius of the rollers, the size of the gap between the rollers, and the thickness of the material being passed. In this way, the pressure application can be highly uniform and well controlled. A calender roll process is continuous and can apply higher and more uniform pressure. The number of cells that can be passed through a calender roll press is limited due to non-uniformity if too many cells are calendered in one pass.

Vertical presses have two hard, flat plates that apply heat and pressure to a material placed between the plates. Unlike calender presses, vertical presses cannot process material in a continuous manner. Additionally, because the total area being pressed at once is substantially greater than a calender press (i.e., it is two dimensional as opposed to a calender press that is nearly one dimensional), the probability for defects and inconsistent pressure application across the surface is significantly higher. However, vertical presses can handle stacks of arbitrary size.

The issues described above with forming multilayer solid-state lithium ion batteries do not arise with liquid electrolyte-based cells, where close and uniform separator/electrode contact is not needed for ionic conduction. This is because the cell is filled with a liquid electrolyte that provides ionic conduction between the separator and electrodes.

Forming a multilayer solid-state lithium-ion battery also presents challenges that are not present with lithium metal anodes of lithium metal batteries. Lithium-ion batteries may use materials such as graphite and/or silicon as the anode active material. These and other non-lithium-metal anodes are not mechanically cohesive in the way lithium foil anodes are. Further, non-lithium-metal anodes are significantly less electrically conductive than lithium foils.

Provided herein are multilayer solid-state lithium ion batteries and methods of fabrication. In some embodiments, units of preformed cell elements and a current collector (of either the anode or cathode) are stacked. The preformed cell element includes a double-sided electrode, with separator/electrode on both sides of the double-sided electrode. The double-sided electrode may be an anode or a cathode. That is the preformed cell element may be: cathode/separator/anode/anode current collector/anode/separator/cathode when it includes a double-sided anode and anode/separator/cathode/cathode current collector/cathode/separator/anode when it includes a double-sided cathode. During the stacking process, the preformed cell elements are laminated to a cathode current collector or an anode current collector, as appropriate.

Because the electrode and separator films of each preformed cell element are laminated and densified prior to stacking, and because a calender press may thus be used for the lamination and densification processes, uneven densification during stacking is avoided or significantly reduced. The individual cell elements have more carefully controlled uniformity, resulting in consistent electrode and separator film thicknesses, consistent separator lamination to electrode surfaces, and consistent degrees of electrode and separator film densification for each element of the multi-layer battery.

Figure 5:
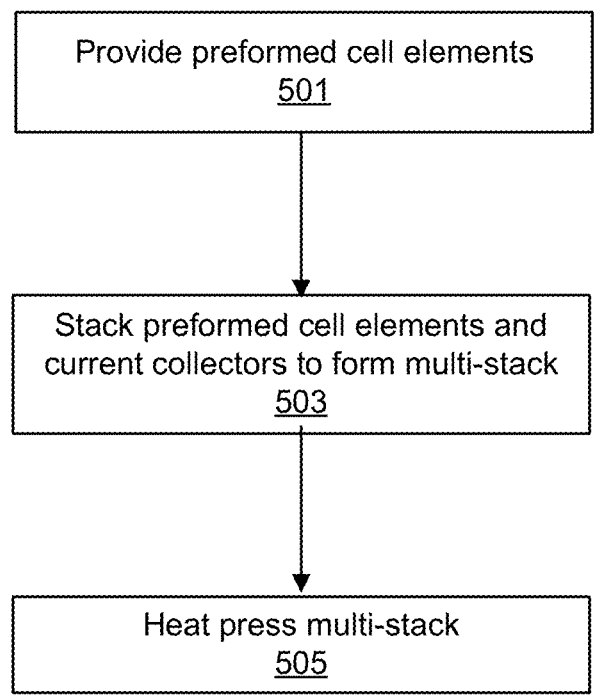
FIG. 5 is a process flow diagram showing certain operations in a method of forming a multilayer solid-state lithium ion battery.

FIG. 5 is a process flow diagram showing certain operations in a method of forming a multilayer solid-state lithium ion battery. First, in an operation 501, preformed cell elements are provided. The preformed cell elements are stacked in an operation 503 to form a multilayer cell. As described further below with reference to FIG. 8, the preformed cell elements are laminated and densified to form a densified unit. In some embodiments, the preformed cell elements are densified electrode/separator/double-sided electrode/separator/electrode units that are layered with current collectors in operation 503. In other embodiments, a current collector is included on only one end of the preformed cell element to form a densified electrode/separator/double-sided electrode/separator/electrode/current collector unit, which is stacked in operation 503. Schematic examples of each of these embodiments are shown with reference to FIGS. 6 and 7 below.

As described further below, the cathode current collector may have a thin layer of conductive adhesive that improves adhesion to the adjacent electrode films. In embodiments in which a double-side cathode is part of the preformed cell element, the preformed cell element includes the conductive adhesive. In embodiments in which the cathode current collector is layered with the preformed cell elements, the conductive adhesive may be provided as additional layers in the stack or pre-applied to the cathode current collector.

Similarly, the anode current collector may have thin layer of conductive adhesive. In embodiments in which a double-side anode is part of the preformed cell element, the preformed cell element includes the conductive adhesive. In embodiments in which the anode current collector is layered with the preformed cell elements, the conductive adhesive may be provided as additional layers in the stack or pre-applied to the anode current collector.

Returning to FIG. 5, the multilayer cell is then heat pressed in an operation 505. In some embodiments, all of the pre-formed elements are layered and then heat pressed at one time. In other embodiments, operations 503 and 505 are repeated one or more times to build the stack up one element or a subset of elements at a time.

Figure 6:
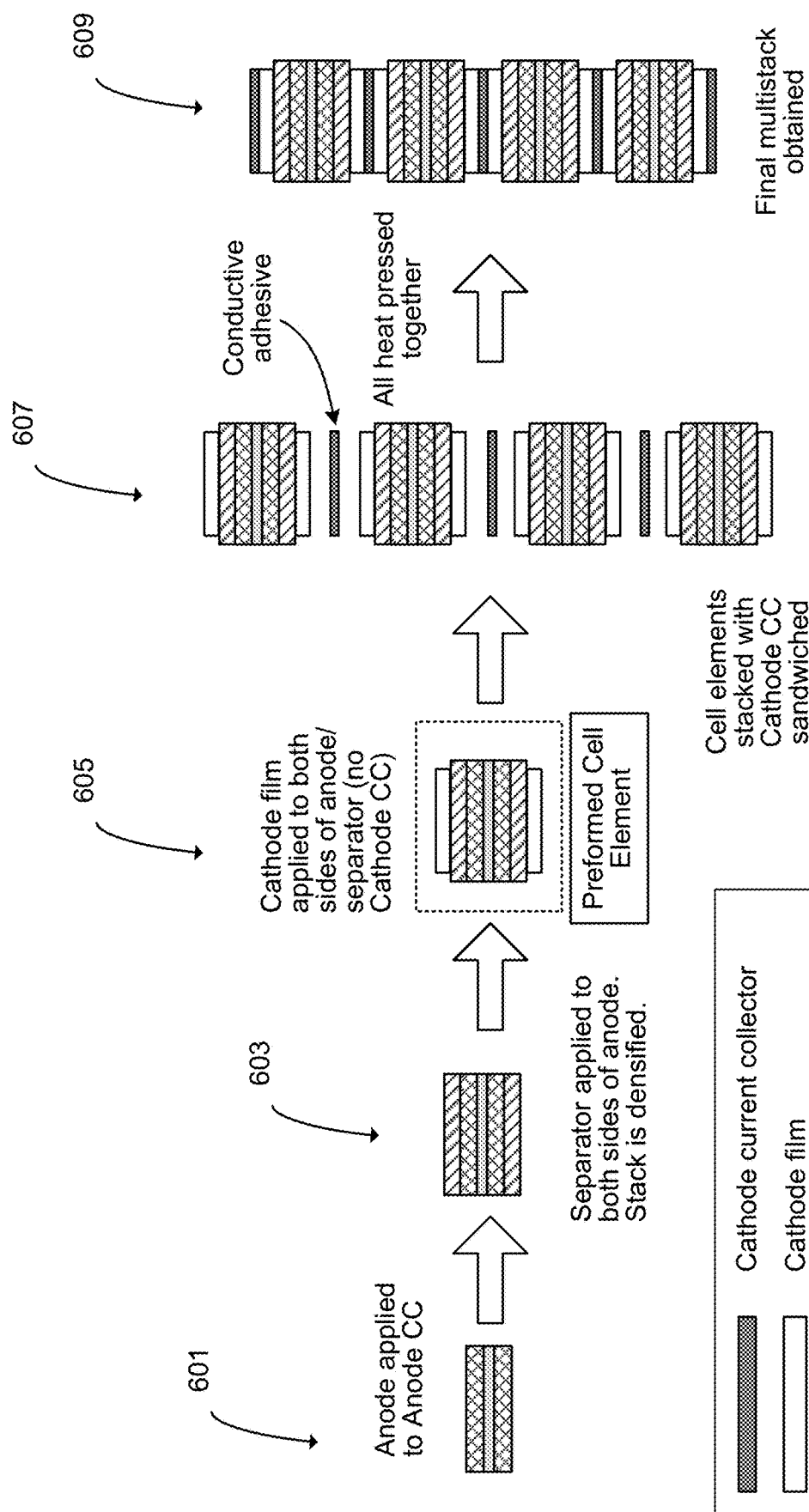
FIG. 6 is a schematic illustration of a process of manufacturing a multilayer solid-state lithium ion battery in which the preformed cell elements are electrode/separator/double-sided electrode/separator/electrode units.

FIG. 6 is a schematic illustration of a process of manufacturing a multilayer solid-state lithium ion battery in which the preformed cell elements are electrode/separator/double-sided electrode/separator/electrode units. At 601, anode films are applied to both sides of an anode current collector to form a double-sided anode. At 603, a separator film is applied to both sides of the anode. The stack is densified, e.g., by calender roll press. At 605, a cathode film is applied to both sides the anode/separator. This forms the preformed cell element to be stacked in the multilayer cell-stack. At 607, the preformed cell elements are stacked with cathode current collectors sandwiched between. In the example shown, the current collector is provided with a conductive adhesive coating on each side. Then, at 609 the stack is heat pressed to form the final multilayer cell.

Figure 7:
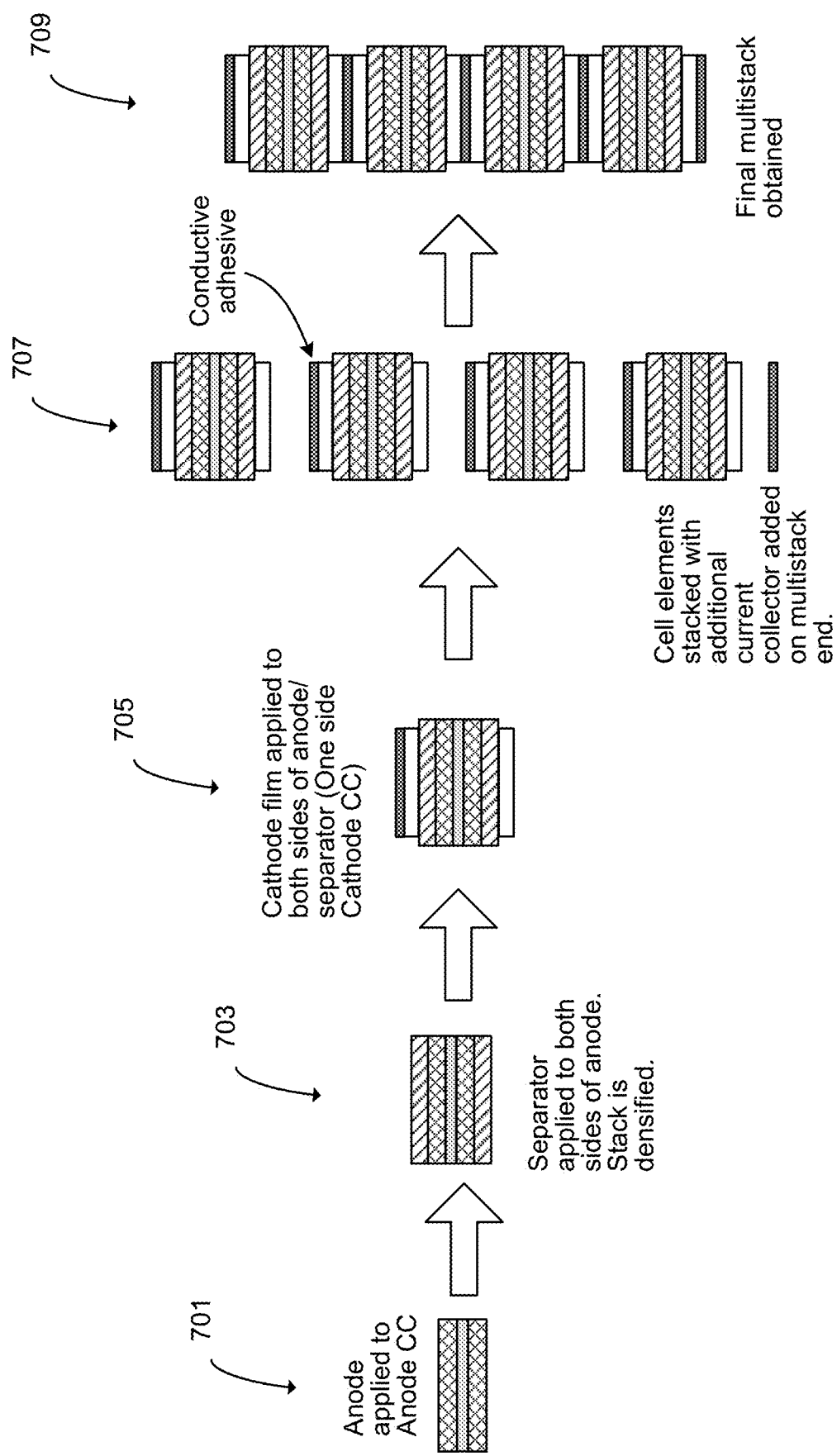
FIG. 7 is a schematic illustration of a process of manufacturing a multilayer cell solid-state lithium ion battery in which the preformed cell elements are electrode/separator/double-sided electrode/separator/electrode/current collector units.

FIG. 7 is a schematic illustration of a process of manufacturing a multilayer cell solid-state lithium ion battery in which the preformed cell elements are electrode/separator/double-sided electrode/separator/electrode/current collector units. Operations 701 and 703 are performed as described above with respect to operations 601 and 603 in FIG. 6. At 705, a cathode film is applied to both sides the anode/separator (as in operation 605) and a current collector is applied to one side of the stack. This forms the preformed cell element to be stacked in the multilayer cell. At 707, the preformed cell elements are stacked. In the example shown, the current collector is provided with a conductive adhesive coating each side. A single cathode current collector is added to the end of the stack having the exposed cathode. Then, at 709 the stack is heat pressed to form the final multilayer cell.

The solid-state electrodes and electrolyte separator described herein are composite films. As described further below, the composite electrolyte separator films may be fabricated by mixing inorganic particles with an organic polymer. Examples of composite films are described further below.

Figure 8:
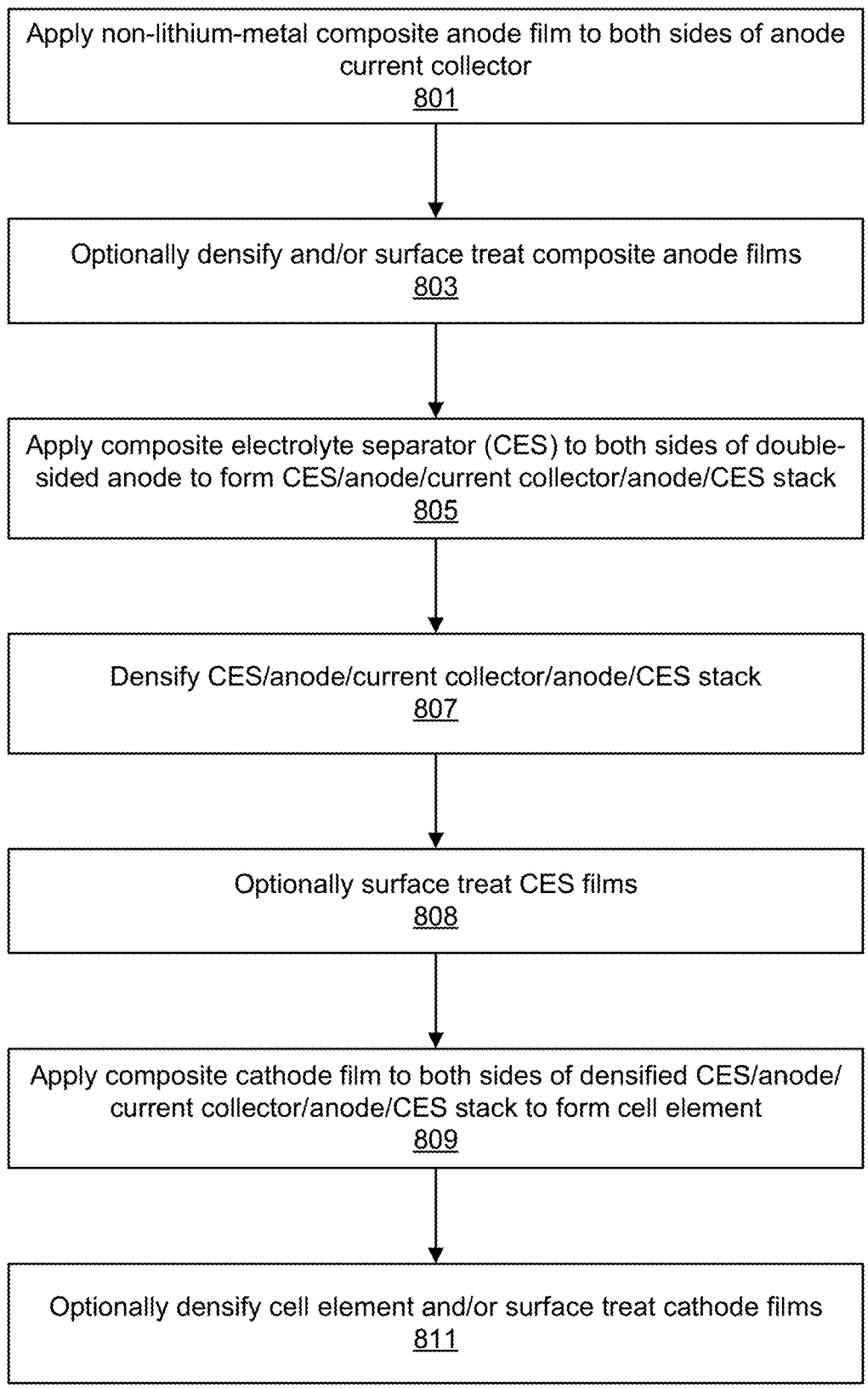
FIG. 8 is a process flow diagram showing certain operations in a method of forming a preformed cell element.

FIG. 8 is a process flow diagram showing certain operations in a method of forming a preformed cell element. In the example shown in FIG. 8, the preformed cell element includes a double-sided anode. First at an operation 801, a non-lithium-metal composite film is applied to both sides of an anode current collector. Examples of non-lithium-metal active materials include graphite and silicon. In the example of FIG. 8, the anode is a composite film and also includes organic polymer as a binder, as well as a solid electrolyte. A conductive additive may also be present.

Operation 801 may involve a slurry casting process, where dry solid components of the electrode are mixed with an appropriate solvent and cast on to a substrate. In some embodiments, the electrode is cast on to a current collector film or onto a release film to be transferred to the current collector film. Slurry coating processes include doctor blade coating, slot die coating, spray coating, screen printing, and gravure coating. Alternatively, the dry solid components of the electrode may be formed into a sheet via a dry, solvent-less extrusion process. The electrode film may then be applied to the current collector using a calender press, hot press, or similar technique.

In some embodiments, a conductive adhesive is disposed between the anode film and the anode current collector. If used, the conductive adhesive is applied to the anode current collector before application of the anode composite film. In some embodiments, commercially available metallic foil coated with the conductive adhesive may be used. In other embodiments, the conductive adhesive may be applied prior to operation 801. Examples of conductive adhesives are given further below.

At operation 803, an optional densification and/or surface treatment of the anode composite films of the double-sided anode can be performed. A densification process can be performed using a vertical heat press, calender roll press, or other technique. In some embodiments, wherein the anode films are densified prior to separator application, the anode film surfaces may be embossed, roughened, or otherwise physically treated to provide a higher contact area for the separator film to promote adhesion and high interfacial ionic conductivity.

At 805, a composite electrolyte separator (CES) is applied to both sides of the double-sided anode. In many embodiments, the CES is a composite film of an ionically conductive inorganic particulate phase in an organic polymer phase. Examples of CES compositions are given below. The CES film may be prepared through traditional slurry cast processes, where dry solid components of the separator are mixed with an appropriate solvent and cast on to a substrate. Alternatively, the dry solid components of the separator may be formed into a sheet via a dry, solvent-less extrusion process. In some embodiments, the separator is cast on a release film and transferred to the electrode surface. In some embodiments, the separator is directly cast on to the electrode surface. Slurry coating processes include doctor blade coating, slot die coating, spray coating, screen printing, gravure coating, and similar methods. If the separator is formed as a free-standing film, the separator is laminated directly to the anode using a calender press. If the separator is formed as a composite film on a release film, the separator is transferred to the anode surface using a calender press, and the release film then removed. Application of the separator film is performed using a calender press, as this provides uniform distribution of pressure. Example thicknesses of the separator may be between 1 micron and 250 microns, for example 15 microns, or 5 to 10 microns, after the separator is applied to the anode and densified.

After the separator is applied to the electrode surfaces, the CES/anode/current collector/anode/CES stack is densified prior to application of the subsequent electrode films in an operation 807. Performing the densification step prior to application of the other electrode films results in improved performance.

In some embodiments, CES film may be embossed, roughened, or surface treated to provide a higher contact area for the composite cathode film to promote adhesion and high interfacial ionic conductivity in an optional operation 808.

Composite cathode film is applied to surface of both separator films, i.e. the top and bottom of the cell element in an operation 809. Cathode films may be prepared through traditional slurry cast processes, where dry solid components of the electrode are mixed with an appropriate solvent and cast on to a substrate. In some embodiments, the electrode is cast on to a substrate such as a release film and applied to the separator surface or cast directly on to the separator surface. Slurry coating processes include doctor blade coating, slot die coating, spray coating, screen printing, gravure coating, or similar methods. Alternatively, the dry solid components of the electrode may be formed into a sheet via a dry, solvent-less extrusion process. The cathode film may then be applied to the separator surface using a calender press, vertical plate press, or similar technique.

If the cathode film is first deposited on a substrate, such as a release film, it may or may not be densified prior to being transferred to the separator film surface. In some embodiments, it may be embossed, roughened, or surface treated to provide a higher contact area for the separator film to promote adhesion and high interfacial ionic conductivity.

After operation 809, the cathode/CES/anode/current collector/anode/CES/cathode cell element is formed. It may be densified and/or the cathode film may be embossed, roughened, or otherwise treated in an optional operation 811. The preformed cell element is ready to be stacked with cathode current collectors as described with reference to FIG. 5.

The process described above with reference to FIG. 8 may be modified with the anode and cathode operations switched, such that the assembly of the preformed cell element begins with element begins with the double-sided cathode, followed by separator application to the cathode, and so on. In this case, the preformed cell elements are stacked with anode current collectors.

Also as described above with reference to FIG. 7, the process of FIG. 8 may be modified to apply a current collector to one of the two electrode surfaces after operation 809 or 811.

In another embodiment, the stacking process can involve two types of preformed cell elements: one type having outermost electrode films with current collector applied to their surface, and a second type, wherein the outermost electrode films do not have current collector applied to their surface. This method allows both types of preformed cell elements to be formed continuously and uniformly with a calender press. The elements are then pressed together during the stacking process.

The stacking process for the embodiments described above involve taking preformed cell elements, and in some embodiments, current collector foil, and heat pressing the stack of cell elements and current collector foils together. This can be performed all at once, or it can be performed one-by-one. Example heat press temperatures range from 25° C. to 200° C., and in some embodiments between 80° C. to 150° C. By application of heat and pressure to the multilayer cell, the electrode film can be pressed into the surface of the current collector.

As described above, in some embodiments, a current collector laminated during the stacking process has a thin layer of a conductive adhesive on its surface that improves adhesion to the electrode film. Examples of conductive adhesives are given below. By applying heat during the stacking process, the cathode or anode film, as well as the conductive adhesive on the surface of the current collector film is allowed to soften, which improves adhesion between the two components. This process may be performed at a pressure ranging from 0.5 MPa to 200 MPa, and in some embodiments between 1 MPa to 40 MPa.

Current Collectors and Conductive Adhesive

A current collector may be any metal foil typically used in an electrochemical cell, for instance nickel, copper, or stainless steel. The current collector may be in the form of a mesh or perforated sheet that serves to improve electrode film adhesion and improve cell energy density. The current collector may also be a three-layer composite film, having a center layer of a polymer, or a polymer composite, where the outer layers are metallic and electrically conductive. The current collector may also have a conductive adhesive on its surfaces, which can serve to improve adhesion of the electrode film to the current collector. Example thicknesses of the current collector are between 1-50 μm and may be between 1-30 μm. The conductive adhesive layer may be between 1 to 20 μm thick on each side of the current collector. In some embodiments, a thin layer of between 1 to 5 μm thick is used. Examples of total thickness (current collector and double-sided conductive adhesive layer) may be from 5 to 70 μm or 10 to 50 μm. In some embodiments, the conductive adhesive serves to protect the metallic foil of the current collector from sulfur embrittlement. In some such embodiments, the conductive adhesive may be physically impermeable to the solid electrolyte material of the electrode.

In some embodiments, conductive adhesives for the cathode and/or anode current collector may include a polymer carbon composite having a carbon additive that is dispersed in a thermoplastic polymer. Examples of thermoplastic polymers include polyethylene (PE), polyacrylates (PA), polyvinylidene fluoride (PVDF), polyamides (e.g. nylon), polypropylene, and polyethylene terephthalates. Examples of carbon additives include carbon black, carbon fibers, carbon nanotubes, and graphene. In some embodiments, the conductive layer may also include dispersants that improve the dispersion of the carbon additives, and hence the layers electrical conductivity. In some embodiments, the conductive adhesive or prime layer may contain metallic particles embedded in a thermoplastic polymer, for example silver, nickel, or gold. Additional examples of conductive adhesives are outlined in the Handbook for Adhesives and Surface Preparation, Handbook for Adhesives and Surface Preparation, Chapter 12, Pages 259-299, G. Rabilloud ISBN: 978-1-4377-4461-3, 2011, incorporated by reference herein. In some embodiments, a thin layer of conductive adhesive may be applied to the outer surface of the preformed cell elements (i.e. the top of the exposed anode or cathode surfaces) to improve electrical conductivity and adhesion with the current collector that is attached during the stacking process.

Electrode Compositions

The anode is characterized by being a non-lithium metal anode. It is a composite film that includes an active material, an electrolyte, and a binder. In some embodiments, a conductive additive may be used. The cathode is also a composite film that includes an active material, an electrolyte, and a binder. In some embodiments, a conductive additive may be used.

Examples of anode active materials include graphite, silicon, carbon coated silicon, silicon alloys (e.g. silicon alloyed with one or more of Al, Zn, Fe, Mn, Cr, Co, Ni, Cu, Ti, Mg, Sn, and Ge), silicon oxides (e.g. SiOx where $0 \leq x \leq 2$), lithium titanium oxide, similar anode active materials or combinations thereof.

Examples of cathode active materials include lithium nickel manganese cobalt oxide ($LiNi_xMn_yCo_zO_2$) ("NMC") where (x=0.8, y=0.1, z=0.1; x=0.6, y=0.2, z=0.2; x=0.5, y=0.3, z=0.2; or x=0.1, y=0.1, z=0.1), lithium nickel cobalt aluminum oxide ($LiNiCoAlO_2$) ("NCA"), lithium manganese oxide ($LiMn_2O_4$) ("LMO"), lithium iron phosphate ($LiFePO_4$) ("LFP"), lithium sulfide ($Li_2S$), elemental sulfur ($S_8$), lithium cobalt oxide ($LiCoO_2$), iron (II) fluoride ($FeF_2$), iron (III) fluoride ($FeF_3$), cobalt (II) fluoride ($CoF_2$), similar cathode active materials or combinations thereof.

Both the cathode and anode may include a carbon additive to provide electrical conduction such as graphene, activated carbons, carbon fibers carbon black, Ketjen black, acetylene black, carbon nanotubes, graphite, C-ENERGY SUPER C65, C-ENERGY SUPER C45, SUPER P Li carbon black, or similar.

The electrodes typically have a binder to provide electrode cohesion and adhesion strength. The binder is generally a polymer. Examples of binders include styrene butadiene rubber (SBR), styrene-isoprene-styrene (SIS), styrene-ethylene-butylene-styrene (SEBS), carboxymethyl cellulose (CMC), poly-acrylic acid (PAA), nitrile rubber (NBR), fluorinated block copolymers such as polyvinylidene fluoride (PVDF), or similar block copolymers.

Each of the anode and cathode electrolyte may be an inorganic electrolyte. It may be an oxide-based composition, a sulfide-based composition, or a phosphate-based composition, and may be crystalline, partially crystalline, or amorphous. In certain embodiments, the inorganic phase may be doped to increase conductivity. Examples of solid lithium ion conducting materials include perovskites (e.g., $Li_{3x}La_{(2/3)-x}TiO_3$, $0 \leq x \leq 0.67$), lithium super ionic conductor (LISICON) compounds (e.g., $Li_{2+2x}Zn_{1-x}GeO_4$, $0 \leq x \leq 1$; $Li_{14}ZnGe_4O_{16}$), thio-LISICON compounds (e.g., $Li_{4-x}A_{1-y}B_yS_4$, A is Si, Ge or Sn, B is P, Al, Zn, Ga;

Li$_{10}$SnP$_2$S$_{12}$), garnets (e.g. Li$_7$La$_3$Zr$_2$O$_{12}$, Li$_5$La$_3$M$_2$O$_{12}$, M is Ta or Nb); NASICON-type Li ion conductors (e.g., Li$_{1.3}$Al$_{0.3}$Ti$_{1.7}$(PO$_4$)$_3$), oxide glasses or glass ceramics (e.g., Li$_3$BO$_3$—Li$_2$SO$_4$, Li$_2$O—P$_2$O$_5$, Li$_2$O—SiO$_2$), argyrodites (e.g. Li$_6$PS$_5$X where X=Cl, Br, I), sulfide glasses or glass ceramics (e.g., 75Li$_2$S-25P$_2$S$_5$, Li$_2$S—SiS$_2$, LiI—Li$_2$S—B$_2$S$_3$) and phosphates (e.g., Li$_{1-x}$Al$_x$Ge$_{2-x}$(PO$_4$)$_3$ (LAGP), Li$_{1+x}$Ti$_{2-x}$Al$_x$(PO$_4$)). Further examples include lithium rich anti-perovskite (LiRAP) particles. As described in Zhao and Daement, Jour J. Am. Chem. Soc., 2012, 134 (36), pp 15042-15047, incorporated by reference herein, these LiRAP particles have an ionic conductivity of greater than 10$^{-3}$ S/cm at room temperature.

Examples of solid lithium ion conducting materials include sodium super ionic conductor (NASICON) compounds (e.g., Na$_{1+x}$Zr$_2$Si$_x$P$_{3-x}$O$_{12}$, 0<x<3). Further examples of solid lithium ion conducting materials may be found in Cao et al., Front. Energy Res. (2014) 2:25 and Knauth, Solid-state Ionics 180 (2009) 911-916, both of which are incorporated by reference herein.

Further examples of ion conducting glasses are disclosed in Ribes et al., J. Non-Cryst. Solids, Vol. 38-39 (1980) 271-276 and Minami, J. Non-Cryst. Solids, Vol. 95-96 (1987) 107-118, which are incorporated by reference herein.

According to various embodiments, an inorganic phase may include one or more types of inorganic ionically conductive particles. The particle size of the inorganic phase may vary according to the particular application, with an average diameter of the particles of the composition being between 0.1 µm and 500 µm for most applications. In some embodiments, the average diameter is between 0.1 µm and 100 µm. In some embodiments, a multi-modal size distribution may be used to optimize particle packing. For example, a bi-modal distribution may be used. In some embodiments, particles having a size of 1 µm or less are used such that the average nearest particle distance in the composite is no more than 1 µm. In some embodiments, average particle size is less 10 µm or less than 7 µm. In some embodiments, a multi-modal size distribution having a first size distribution with an average size of less than 7 µm and a second size of greater than 10 µm may be used. Larger particles lead to electrodes with fewer grain boundaries and better ionic conductivities, while smaller particles give more compact, uniform electrode films with lower porosity, better density, and more interfacial contact with electrode active materials.

The inorganic phase may be manufactured by any appropriate method. For example, crystalline materials may be obtained using different synthetic methods such as solution, sol-gel, and solid-state reactions. Glass electrolytes may be obtained by quench-melt, solution synthesis or mechanical milling as described in Tatsumisago, M.; Takano, R.; Tadanaga K.; Hayashi, A. J. Power Sources 2014, 270, 603-607, incorporated by reference herein.

As used herein, the term amorphous glass material refers to materials that are at least half amorphous though they may have small regions of crystallinity. For example, an amorphous glass particle may be fully amorphous (100% amorphous), at least 95% (vol). amorphous, at least 80% (vol.) amorphous, or at least 75% (vol.) amorphous. While these amorphous particles may have one or more small regions of crystallinity, ion conduction through the particles is through conductive paths that are mostly or wholly isotropic. Ionically conductive glass-ceramic particles have amorphous regions but are at least half crystalline, for example, having at least 75% (vol.) crystallinity. Glass-ceramic particles may be used in the composites described, herein, with glass-ceramic particles having a relatively high amount of amorphous character (e.g., at least 40 (vol) % amorphous) useful in certain embodiments for their isotropic conductive paths. In some embodiments, ionically conductive ceramic particles may be used. Ionically conductive ceramic particles refer to materials that are mostly crystalline though they may have small amorphous regions. For example, a ceramic particle may be fully crystalline (100% vol. crystalline) or at least 95% (vol). crystalline. In some embodiments, the inorganic phase includes argyrodites. The argyrodites may have the general formula: A$_{7-x}$PS$_{6-x}$Hal$_x$ where A is an alkali metal and Hal is selected from chlorine (Cl), bromine (Br), and iodine (I).

In some embodiments, the argyrodite may have a general formula as given above, and further be doped. An example is argyrodites doped with thiophilic metals:

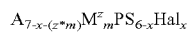
$$A_{7-x-(z*m)}M^z{}_mPS_{6-x}Hal_x$$

wherein A is an alkali metal; M is a metal selected from manganese (Mn), iron (Fe), cobalt (Co), nickel (Ni), copper (Cu), zinc (Zn), and mercury (Hg); Hal is selected from chlorine (Cl), bromine (Br), and iodine (I); z is the oxidation state of the metal; 0<x≤2; and 0<y<(7−x)/z. In some embodiments, A is lithium (Li), sodium (Na) or potassium (K). In some embodiments, A is Li. Metal-doped argyrodites are described further in U.S. patent application Ser. No. 16/829,962, incorporated by reference herein. In some embodiments, the composite may include oxide argyrodites, for example, as described in U.S. patent application Ser. No. 16/576,570, incorporated by reference herein.

Alkali metal argyrodites more generally are any of the class of conductive crystals of cubic symmetry that include an alkali metal. This includes argyrodites of the formulae given above as well as argyrodites described in US Patent Publication No. 20170352916 which include Li$_{7-x+y}$PS$_{6-x}$Cl$_{x+y}$ where x and y satisfy the formula 0.05≤y≤0.9 and −3.0x+1.8≤y≤−3.0x+5, or other argyrodites with A$_{7-x+y}$PS$_{6-x}$Hal$_{x+y}$ formula. Such argyrodites may also be doped with metal as described above, which include A$_{7-x+y-(z*m)}$M$^z{}_m$PS$_{6-x}$Hal$_{x+y}$.

Separator

The separator may include a composite material including a polymeric phase and an inorganic phase. The inorganic phase conducts alkali ions. In some embodiments, it is responsible for all of the ion conductivity of the composite material, providing ionically conductive pathways through the composite material. In other embodiments, an ionically conductive polymer may be used.

The inorganic phase may be a particulate solid-state material that conducts alkali ions. Examples are described above with reference to the electrolytes that may be used in the electrode compositions.

According to various embodiments, an inorganic phase may include one or more types of inorganic ionically conductive particles. The particle size of the inorganic phase may vary according to the particular application, with an average diameter of the particles of the composition being between 0.1 µm and 500 µm for most applications. In some embodiments, the average diameter is between 0.1 µm and 100 µm. In some embodiments, a multi-modal size distribution may be used to optimize particle packing. For example, a bi-modal distribution may be used. In some embodiments, particles having a size of 1 µm or less are used such that the average nearest particle distance in the composite is no more than 1 µm. This can help prevent dendrite growth. In some embodiments, average particle size is less 10 µm or less than 7 µm. In some embodiments, a multi-modal size distribution having a first size distribution with an average size of less than 7 µm and a second size of greater than 10 µm may be used. Larger particles lead to composite electrolyte separator films with fewer grain boundaries and better conductivities, while smaller particles give more compact, uniform separator films with lower porosity and better density.

In some embodiments, the organic phase has substantially no ionic conductivity, and is referred to as "non-ionically conductive." Non-ionically conductive polymers described herein have ionic conductivities of less than 0.0001 S/cm. In some embodiments, the organic phase may include a polymer that is ionically conductive in the present of a salt such as LiI. Ionically conductive polymers such as polyethylene oxide (PEO), polypropylene oxide (PPO), polyacrylonitrile (PAN), poly(methyl methacrylate) (PMMA), which are ionically conductive dissolve or dissociate salts such as LiI. Non-ionically conductive polymers do not dissolve or dissociate salts and are not ionically conductive even in the presence of a salt. This is because without dissolving a salt, there are no mobile ions to conduct.

The polymer loading in the solid phase composites may be relatively high in some embodiments, e.g., being at least 2.5%-30% by weight. According to various embodiments, it may between 0.5 wt %-60 wt % polymer, 1 wt %-40 wt % polymer, or 2.5 wt %-30 wt %. The solid phase composites form a continuous film.

In some embodiments, the composite contains a non-polar polymer that is soluble in a non-polar solvent and a polymer that is insoluble in the non-polar solvent. The non-polar solvent may have a polarity index of between 0 and 3.5 in some embodiments. Solvents with higher polarity indexes may be used as well if the sulfide electrolytes are stable therein. An example is chloroform, which has a polarity index of 4.1. Other halogenated solvents may also be used. In some such embodiments, the insoluble polymer is polar. In some embodiments, the insoluble polymer is a higher wt. % in the composite than the non-polar polymer. In this manner, the composite will have mechanical properties of the polar polymer with sufficient non-polar polymer to maintain conductivity. In some embodiments, for example, less than 5 wt. % of a solid phase composite may be a non-polar polymer. In some embodiments, this may be less than 4 wt. %, less than 3 wt. %, less than 2 wt. %, or less than 1 wt %. Most of or in some embodiments, essentially all, of the remaining polymer is the polar polymer or other insoluble polymer. According to various embodiments, at least 50.1 wt % and up to 98 wt % of the organic phase may be insoluble polymer.

In some embodiments, the solid-phase separators consist essentially of ion-conductive inorganic particles and an organic phase. However, in alternative embodiments, one or more additional components may be added to the solid separators.

According to various embodiments, the solid compositions may or may not include an added salt. Lithium salts (e.g., LiPF6, LiTFSI), potassium salts, sodium salts, etc. can be added to improve ionic conductivity in embodiments that include an ionically conductive polymer such as PEO. In some embodiments, the solid-state compositions include substantially no added salts. "Substantially no added salts" means no more than a trace amount of a salt. In some embodiments, the ionic conductivity of the composite is substantially provided by the inorganic particles. Even if an ionically conductive polymer is used, it may not contribute more than 0.01 mS/cm, 0.05 mS/cm. or 0.1 mS/cm to the ionic conductivity of the composite. In other embodiments, it may contribute more.

In some embodiments, the solid-state separator may include one or more conductivity enhancers. In some embodiments, the electrolyte may include one or more filler materials, including ceramic fillers such as $Al_2O_3$. If used, a filler may or may not be an ion conductor depending on the particular embodiment. In some embodiments, the composite may include one or more dispersants. Further, in some embodiments, an organic phase of a solid-state composition may include one or more additional organic components to facilitate manufacture of an electrolyte having mechanical properties desired for a particular application.

In some embodiments, the separator composition may include an electrode stabilizing agent that can be used to form a passivation layer on the surface of an electrode. Examples of electrode stabilizing agents are described in U.S. Pat. No. 9,093,722. In some embodiments, the electrolyte may include conductivity enhancers, fillers, or organic components as described above.

A separator film may be of any suitable thickness depending upon the particular battery or other device design. For many applications, the thickness may be between 1 micron and 250 microns, for example 15 microns. In some embodiments, the electrolyte may be significantly thicker, e.g., on the order of millimeters.

For cathode compositions, the table below gives examples of compositions.

| Constituent | Active material | Inorganic conductor | Electronic conductivity additive | Organic phase |
|---|---|---|---|---|
| Examples | Transition Metal Oxide<br>Transition Metal Oxide with layer structure<br>NMC | Argyrodites (e.g., $Li_6PS_5Cl$), $Li_{5.6}PS_{4.6}Cl_{1.4}$, $Li_{5.4}M_{0.1}PS_{4.6}Cl_{1.4}$, $Li_{5.8}M_{0.1}PS_5Cl$, $Na_{5.8}M_{0.1}PS_5Cl$<br>Sulfide glasses or glass ceramics (e.g., $75Li_2S \cdot 25P_2S_5$) | Carbon-based<br>Activated carbons<br>CNTs<br>Graphene<br>Graphite<br>Carbon fibers<br>Carbon black<br>(e.g., Super C) | Hydrophobic block copolymers having soft and hard blocks<br>PVDF and SEBS<br>PMMA and SEBS<br>Nylon and SEBS<br>SEBS<br>SIS<br>PMMA<br>PVDF<br>PS-PVDF<br>PVDF grafted with PS<br>NBR<br>Grafted SEBS with polar polymer blocks |
| Wt % range | 65%-88% | 10%-33% | 1%-5% | 1%-5% |

For anode compositions, the table below gives examples of compositions.

| Constituent | Primary active material | Secondary active material | Inorganic conductor | Electronic conductivity additive | Organic phase |
|---|---|---|---|---|---|
| Examples | Si—containing Elemental Si Si alloys, e.g., Si alloyed with one or more of Al, Zn, Fe, Mn, Cr, Co, Ni, Cu, Ti, Mg, Sn, Ge Graphite | Graphite | Agyrodites (e.g., $Li_6PS_5Cl$, $Li_{5.6}PS_{4.6}Cl_{1.4}$, $Li_{5.4}M_{0.1}PS_{4.6}Cl_{1.4}$, $Li_{5.8}M_{0.1}PS_5Cl$, $Na_{5.8}M_{0.1}PS_5Cl$ Sulfide glasses or glass ceramics (e.g., $75Li_2S \cdot 25P_2S_5$) | Carbon-based Activated carbons CNTs Graphene Carbon fibers Carbon black (e.g., Super C) | Hydrophobic block copolymers having soft and hard blocks PVDF and SEBS PMMA and SEBS Nylon and SEBS SEBS SIS NBR PVDF PS-PVDF PVDF grafted with PS Grafted SEBS with polar polymer blocks |
| Wt % range | Si is 15%-50% | 5%-40% | 10%-60% | 0%-5% | 1%-5% |

Example Embodiments

In a first step, an anode slurry is prepared by combining a silicon active material, inorganic electrolyte (argyrodite), polymeric binder solution, and carbon additive in a solvent to form an anode slurry. The polymer binder solution includes a polymer binder that is pre-dispersed in a solvent to improve dispersion during the slurry formation process. The anode slurry is mixed and then cast on both sides of an anode current collector using a doctor blade. Coating at scale can be performed using traditional roll-to-roll coating methods. The anode film is then dried to fully remove the solvent. The anode current collector may be stainless steel, nickel, or copper. In some embodiments, the anode current collector may have a surface coating that provides improved adhesion with the anode film.

In a second step, a composite electrolyte separator slurry is prepared from solid electrolyte, a polymer binder solution, and a solvent. The CES slurry is then cast on to a release film, or directly on to the top and bottom surfaces of the double-sided anode produced in the first step. Examples of release films for the CES include Teflon, polyimide, nickel foil, aluminum foil, and stainless-steel foil. Transfer of the CES film from the release film on to both sides of the double-sided anode is achieved using a heated calender press. The calender press may be set to a temperature between 80° C.-150° C. to achieve sufficient heating of anode and separator elements, which improves adhesion and promotes electrolyte contact. The release film is then removed from the separator surfaces to expose the separator surface for the third process step.

In a third step, a cathode slurry is prepared by combining cathode active material, solid electrolyte, binder solution, and carbon additive in a solvent to form a cathode slurry. The cathode slurry is mixed and then cast on to a release film. Example release films include Teflon, polyimide, nickel foil, aluminum foil, and stainless steel foil. The cathode film is then dried to completely remove the solvent. In other embodiments, the cathode slurry may be cast directly on to both separator surfaces of the cell element. Transfer of the cathode film from the release film to both separator surfaces of the cell element can be achieved using a calender press. The calender press may be set to a temperature between 80° C.-150° C. The release film is then removed from the cathode surfaces. The adhesion strength of the release film and the cathode film is lower than the adhesion strength of the cathode film to the electrolyte separator.

After formation of the preformed cell elements achieved in the first three steps, the cell elements are taken and sandwiched with current collector to form a multilayer stack of alternating preformed cell elements and current collector sheets. In one example, three preformed cell elements are sandwiched between multiple layers of cathode current collector foil. An aluminum foil current collector with a surface coating of carbon and polymer (referred to as a prime layer), obtained from Armor Group, Inc. is used as the cathode current collector. The current collector film is punched to be the same dimensions as the cathode of the preformed cell element. After layering the multilayer stack assembly, the stack is inserted into a vertical heat press. The vertical heat press is set to a temperature between 80° C.-150° C., for example between 110° C.-140° C., and applies a force ranging from 500 lbf to 25000 pound-force (lbf), e.g., between 500 lbf to 5000 lbf. This heat pressing step bonds the cathode films of preformed cell elements to the primed aluminum current collector. As adjacent cathodes share the same current collector foil, the multilayer cell thus contains no redundant current collector.

In other embodiments, the cathode current collector film may be punched to be slightly larger in length and width than the cathode film of the cell element. This ensures that edges of the cathode current collector are not mistakenly pressed into the active cell area (i.e. the cathode area) during the stacking process. In some such embodiments, the exterior edge of the cathode current collector is coated in a border of polymer that protects the edges of the current collector and prevents the edges from pressing into the separator film, which may inadvertently lead to short circuiting of the cell.

CONCLUSION

The foregoing describes the instant invention and its certain embodiments. Numerous modifications and variations in the practice of this invention are expected to occur to those skilled in the art. For example, while the above specification describes electrolytes and electrodes for alkali ion or alkali metal batteries, the compositions described may be used in other contexts. Further, the batteries and battery components described herein are no limited to particular cell designs. Such modifications and variations are encompassed within the following claims.

The invention claimed is:

1. A method comprising:
forming a separator/first electrode/first current collector/first electrode/separator stack, wherein the first electrode is one of an anode composite film and a cathode composite film and the separator is a composite electrolyte separator (CES);
densifying the separator/first electrode/first current collector/first electrode/separator stack;
applying a second electrode to the densified separator/first electrode/first current collector/first electrode/separator stack to form a first preformed cell element comprising a second electrode/separator/first electrode/first current collector/first electrode/separator/second electrode stack, wherein the second electrode is the other of the anode composite film and the cathode composite film;
stacking the first preformed cell element with one or more additional preformed cell elements separated by second current collectors to form a multilayer cell; and
heat pressing the multilayer cell.

2. The method of claim 1, further comprising attaching a second current collector to one side of the first preformed cell element prior to stacking it with the one or more additional preformed cell elements.

3. The method of claim 2, wherein attaching the second current collector comprises laminating it to the first preformed cell element.

4. The method of claim 1, wherein stacking the first preformed cell element with the one or more additional preformed cell elements comprises stacking a second current collector between adjacent preformed cell elements.

5. The method of claim 4, wherein heat pressing the multilayer cell comprises laminating a second current collector to second electrodes of adjacent preformed cell elements.

6. The method of claim 1, wherein the first preformed cell element further comprises a conductive adhesive layer disposed between the first electrode and the adjacent first current collector.

7. The method of claim 1, wherein the multilayer cell comprises conductive adhesive layers disposed between the second electrodes and the adjacent second current collectors.

8. The method of claim 1, wherein the anode composite film comprises an active material, an electrolyte, and a polymer binder.

9. The method of claim 1, wherein the cathode composite film comprises an active material, an electrolyte, and a polymer binder.

10. The method of claim 1, wherein the CES comprises an inorganic particulate ion conductor and an organic polymer.

11. The method of claim 1, wherein densifying the separator/first electrode/first current collector/first electrode/separator stack comprises densifying in a calender press.

12. A method comprising:
providing a preformed cell element comprising a second electrode/separator/first electrode/first current collector/first electrode/separator/second electrode stack, wherein the first electrode is one of an anode composite film and a cathode composite film, the second electrode is the other of the anode composite film and the cathode composite film, and the separator is a composite electrolyte separator (CES); and
laminating a second current collector to a second electrode of the preformed cell element.

13. The method of claim 12, wherein the preformed cell element further comprises a conductive adhesive layer disposed between the first electrode and the adjacent first current collector.

14. The method of claim 12, further comprising disposing a conductive adhesive layer between the second electrode and the adjacent second current collector.

15. The method of claim 12, wherein the anode composite film comprises an active material, an electrolyte, and a polymer binder.

16. The method of claim 12, wherein the cathode composite film comprises an active material, an electrolyte, and a polymer binder.

17. The method of claim 1, wherein the CES comprises an inorganic particulate ion conductor and an organic polymer.

* * * * *